United States Patent
Hinds et al.

(10) Patent No.: US 8,856,955 B2
(45) Date of Patent: Oct. 7, 2014

(54) REMEDIATING UNAUTHORIZED SHARING OF ACCOUNT ACCESS TO ONLINE RESOURCES

(75) Inventors: Jennifer L. Hinds, Woodinville, WA (US); Matthew R. Shanahan, Seattle, WA (US); Mark B. Upson, Mercer Island, WA (US)

(73) Assignee: ServiceSource International, Inc., San Francisco, CA (US)

( * ) Notice: Subject to any disclaimer, the term of this patent is extended or adjusted under 35 U.S.C. 154(b) by 414 days.

(21) Appl. No.: 13/050,712

(22) Filed: Mar. 17, 2011

(65) Prior Publication Data

US 2011/0289597 A1     Nov. 24, 2011

Related U.S. Application Data

(60) Provisional application No. 61/345,667, filed on May 18, 2010.

(51) Int. Cl.
    *G06F 21/00*          (2013.01)
    *G06F 21/31*          (2013.01)
    *G06F 21/42*          (2013.01)

(52) U.S. Cl.
    CPC .............. *G06F 21/316* (2013.01); *G06F 21/42* (2013.01)
    USPC ...................................... 726/28; 726/3; 726/6

(58) Field of Classification Search
    CPC .............................. G06F 21/42; G06F 21/316
    USPC ............................... 726/26–30, 1–9
    See application file for complete search history.

(56) References Cited

U.S. PATENT DOCUMENTS

| | | | |
|---|---|---|---|
| 2008/0103751 A1* | 5/2008 | Hsiung et al. | 703/20 |
| 2009/0024663 A1* | 1/2009 | McGovern | 707/104.1 |
| 2009/0049555 A1* | 2/2009 | Cho et al. | 726/26 |
| 2009/0276839 A1* | 11/2009 | Peneder | 726/8 |
| 2009/0293119 A1* | 11/2009 | Jonsson | 726/19 |
| 2009/0319435 A1* | 12/2009 | Little et al. | 705/76 |
| 2010/0005525 A1* | 1/2010 | Fischer | 726/21 |
| 2010/0114776 A1* | 5/2010 | Weller et al. | 705/44 |
| 2010/0122329 A1* | 5/2010 | Jakobsson et al. | 726/6 |
| 2010/0125906 A1* | 5/2010 | Golle et al. | 726/18 |
| 2010/0235897 A1* | 9/2010 | Mason et al. | 726/7 |
| 2011/0055913 A1* | 3/2011 | Wong | 726/9 |
| 2012/0060214 A1* | 3/2012 | Nahari | 726/19 |

\* cited by examiner

*Primary Examiner* — Haresh N Patel
(74) *Attorney, Agent, or Firm* — Mersenne Law LLP

(57) ABSTRACT

A number of effective alternatives for discouraging unauthorized online-resource sharing are discussed. An anti-sharing strategy can be built by applying one or more of the alternatives in response to possible, strongly-suspected or virtually certain unauthorized sharing.

17 Claims, 5 Drawing Sheets

REMEDIATING UNAUTHORIZED SHARING OF ACCOUNT ACCESS TO ONLINE RESOURCES

CLAIM OF PRIORITY

This application claims the benefit of U.S. Provisional Patent application No. 61/345,667, filed 18 May 2010.

FIELD

The invention relates to controlling access to resources by computer means. More specifically, the invention relates to methods of responding to detection of users' unauthorized sharing of online resources.

BACKGROUND

Computer systems often control or mediate access to physical and virtual resources by authenticating a user before allowing him to access the resource. For example, a user may have to "log in" to a website, database or online game network before being permitted to retrieve information or participate in the game. An organization that provides the protected resource may levy a subscription fee or other charge before granting access. A common difficulty for such organizations is that an authorized user may "lend" his access credentials (e.g., his username and password) to someone else, allowing the second person to use the resource without paying. Such lending of credentials often violates the policies or contracts of the organization providing the resources, and deprives that organization of revenue, security, or other things of value.

The problem of account sharing can be subdivided into a number of aspects, including detecting excess users, and dealing with them. The inventors' patent application Ser. No. 12/547,423, now U.S. Pat. No. 8,285,658 describes a method for detecting the unauthorized sharing of accounts used to access electronic or online resources. The invention described herein describes several ways for dealing with such unauthorized sharing once it has been detected (by any means that detection might be accomplished).

The prior art in this area identifies sharing using manual methods, and responds to that sharing with ad-hoc manual processes. Our invention is better because:

The detection of sharing, and the subsequent remediation of the sharing, can be clone in an automated way, without requiring human intervention. Automating this process makes it less costly, more deterministic, and allows it to happen far more rapidly than is possible with manual methods.

The remediation of sharing happens according to a set pattern of rules, which can be more effective than judgment-based or error-prone manual processes.

BRIEF DESCRIPTION OF DRAWINGS

Embodiments of the invention are illustrated by way of example and not by way of limitation in the accompanying Figures, in which like references indicate similar elements. It should be noted that references to "an" or "one" embodiment in this disclosure are not necessarily to the same embodiment, and such references mean "at least one."

DETAILED DESCRIPTION

Figure 1:
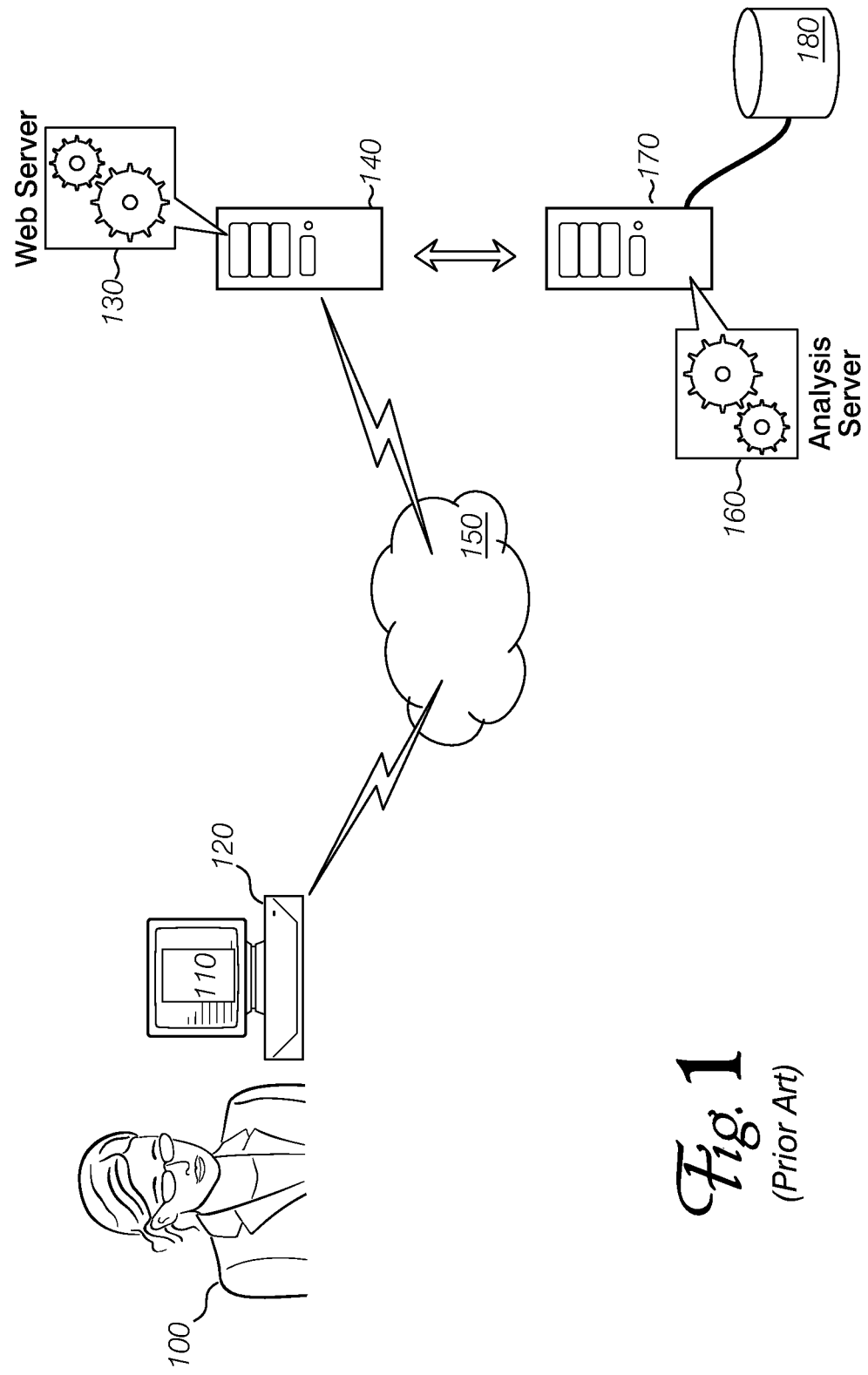
FIG. 1 shows some computers and logical elements (e.g., web server software) that interact when an embodiment of the invention is in operation.

The following discussion will illustrate operations according to the inventive principles by describing a specific example application: a password-protected resource on a Web server. FIG. 1 shows some relevant pieces of this system. In FIG. 1, a user 100 is using her Web Browser 110 (software running on a general purpose computer 120) to access resources provided by the Web Server 130 (software running on another general purpose computer 140). Computers 120 and 140 (and the respective software programs running on each) may communicate via a distributed data communication network 150 such as the Internet. User 100 has an account on the Web Server 130 which allows her (or a fixed number of affiliated users, such as employees of her company) to use that account. Web Server 130 reports the details of the user 100's use of the password-protected resource to the Analysis Server 160, which may be a software program running on yet another general-purpose computer 170. Analysis Server 160 stores the details in its database 180.

The present invention concerns actions taken after the Analysis Server 160 discovers that the account on the Web Server 130 is being used by more individuals than are allowed under the account holder's license. This discovery may happen using the method of application Ser. No. 12/547,423 or other methods. It is appreciated that the Analysis Server 160 may produce a continuously-valued measure indicating, for example, a degree of confidence or suspicion that unauthorized sharing is taking place, rather than a binary yes/no indication. In the continuously-valued case, an administrator of the system might set a threshold level at which account-sharing is deemed to be occurring.

Figure 2:
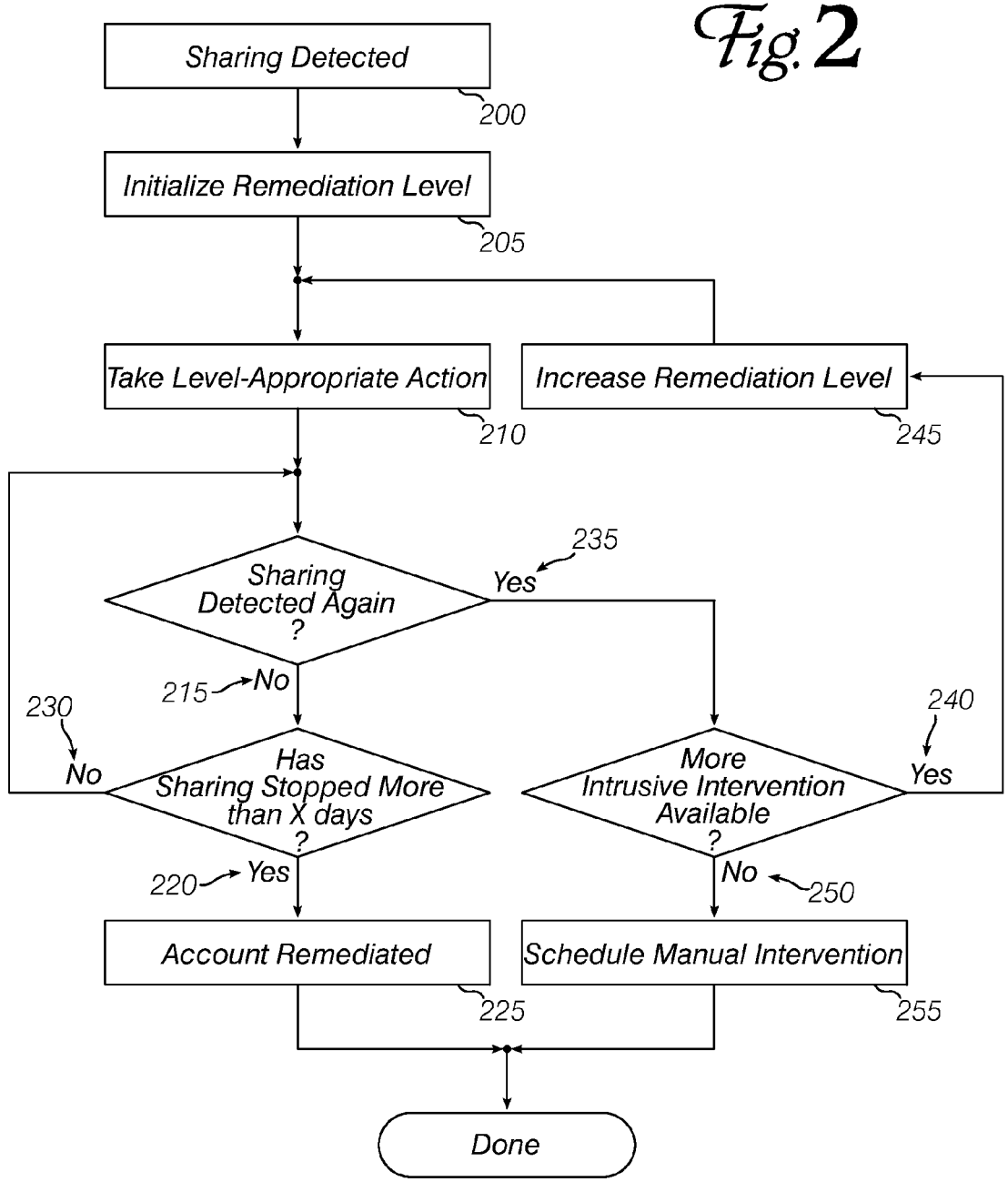
FIG. 2 outlines how an embodiment of the invention may select sharing remediation operations.

In the embodiment being described here, once account sharing has been detected, the Analysis Server 160 instructs the Web Server 130 to change its behavior to remediate that account sharing according to the general method outlined in FIG. 2.

When sharing is detected (200), a "remediation-level" setting associated with the user account is initialized (205). Generally, when an account with no previous illicit sharing activity is identified, a mild or low-level remediation level may be selected. For an account with previous violations recorded, the initial level after detection of renewed sharing activity may be higher. Sharing detection is not a primary focus of embodiments of this invention, and the detection may occur at any time. Further, the setting of remediation-level may occur at the time of detection, or (for example) the user-authentication process of the web server may query the analysis server for information about sharing suspicions/likelihood of sharing when a user has presented his credentials (e.g., username and password) in order to access the account.

Based on the user account's remediation level, one of a number of corrective actions is taken (210). (Several example actions and general principles for designing corrective actions are discussed below.)

After the corrective action, the system continues to monitor the account for unabated sharing activity. If no further sharing is detected (215) for more than a configurable period of time (220) then the account is considered remediated (225) and an embodiment has no further involvement unless new sharing activity is detected. If the configurable time period has not yet elapsed (230) then the embodiment continues to monitor the account.

If new instances of account sharing are detected (235) after a remediative action has been taken, then the system checks the account's remediation level to determine whether more aggressive intervention tactics are available. If not (250), then the embodiment may schedule a manual intervention (255). If more aggressive automatically-selectable tactics are available (240) then the remediation level is increased (245) and a new level-appropriate action is implemented. In some embodiments, instead of scheduling a manual intervention (255), the system may simply repeat the highest-level action while sharing continues to be detected.

Embodiments of the invention select automatically from among a set of responses to suspected account sharing, and implement an escalating response policy. Responses can be added and removed from the active set depending on results achieved in a particular environment, weighed against factors such as the accuracy of sharing detection and the adverse customer impact of implementing a remediation when there has not actually been unauthorized sharing.

The mildest remediations may simply display a message to a user whose account is suspected of being shared. The message may be unobtrusively located on the page, or may appear in a pop-up dialog window that must be acknowledged before access can continue. More intrusive remediations may include out-of-band messages (i.e., email or SMS text messages) or messages to supervisors of the user suspected of sharing. A user may be required to change his password, or a new password can be chosen for him. In cases of rampant unauthorized sharing, the user's account may be locked for a period of time, or until some other event occurs.

Figure 3:
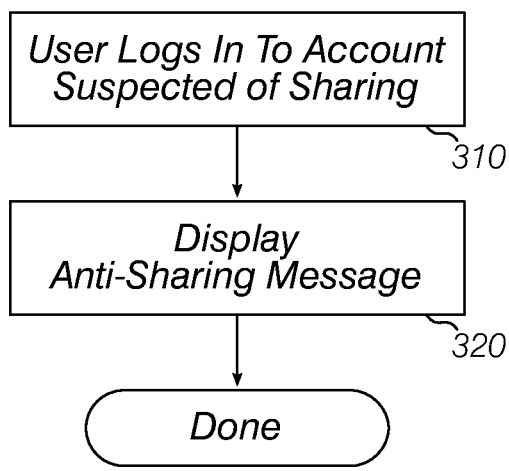
FIG. 3 shows how the "Pop-Up Alert" remediation operation may proceed.

FIG. 3 outlines a low-level or "mild" remediation action. At 310, a user logs into an account that has been flagged or marked by the Analysis Server as likely to be experiencing unauthorized sharing. The web server displays an anti-sharing message (320), for example as an introductory paragraph to the normal home page, as an interstitial page before the home page, or as a pop-up dialog. The messages can be tested and adjusted for efficacy. The goal is not to offend or scare the user (unless that is unavoidable), but merely to convince him to stop allowing unauthorized persons to access his account. (Or, in the case that an unauthorized user has logged in and seen the message, to deter the user from making further unauthorized use of the resources.)

Figure 4:
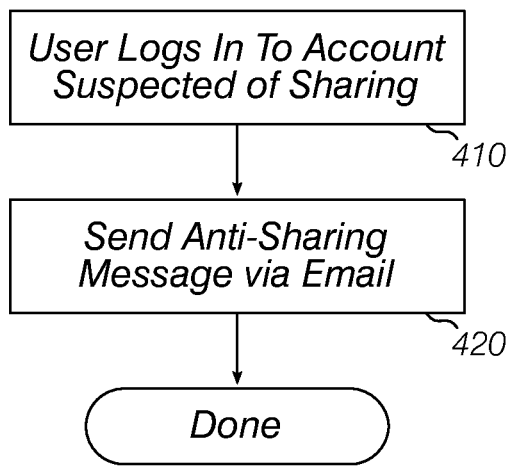
FIG. 4 shows how the "Email Notice" remediation operation may proceed.

FIG. 4 shows a related "message-sending" remediation method. As in FIG. 3, when a user logs into an account that is suspected of unauthorized sharing (410), an electronic mail message is sent (420), reminding the recipient of the terms and obligations of use of the online resources. In this method, the recipient can be the authorized user himself, the user and a supervisor responsible for the user's access, or another party who might be liable for the apparent violation of the conditions under which the online access is offered.

In an alternate embodiment of "message-sending" remediation, the recipient of the message may be an automatic workflow management system, and the message may schedule an account-management or sales call to be placed on the party ultimately responsible for the user's online access. For example, many companies use an online customer relationship management ("CRM") automation tool called Salesforce.com. The message sent could automatically schedule a call by an account representative, who would remind the customer of the terms of use, and inquire whether a greater number of user licenses is appropriate under the circumstances. Thus, the recipient of the message might be a person who is directly or indirectly responsible for the suspected unauthorized use, or a person who may be able to turn the unauthorized use into additional sales of the underlying resource.

Sending or presenting messages reminding users of their license obligations may be effective to dissuade cheating by users whose moral compasses permit such cheating as long as it appears to be undetected. The tenor of the message can be varied depending on the system's certainty that unauthorized sharing has occurred and the number of previous detections. For example, a first message might be phrased as a "reminder," while subsequent messages might ask whether the user "inadvertently" disclosed his password or whether he wishes to increase the number of authorized users on his subscription. These messages can be tested for effectiveness vs. excessive antagonism to achieve a balance that improves the authorized:unauthorized user ratio.

Figure 5:
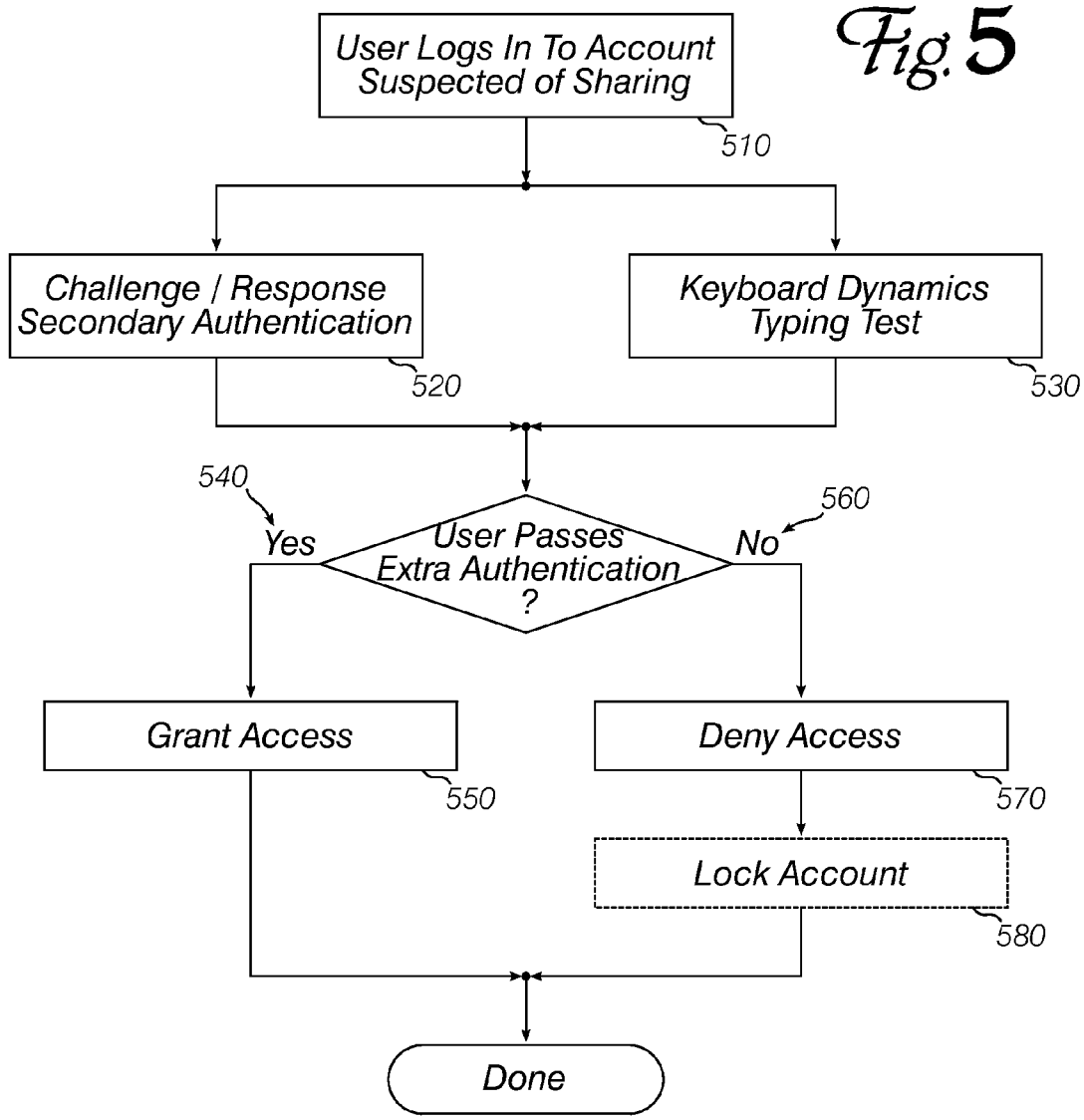
FIG. 5 shows how a "Strong Authentication" remediation operation may proceed.

If the suspecting sharing is not abated by inline, pop-up or out-of-band (e.g. electronic mail) messages, an extra authentication step may be performed when a user logs into an account suspected of sharing. As FIG. 5 shows, when the user logs in (510), the system may interpose a challenge/response step (520) or a keystroke-dynamics typing test (530). The challenge/response process may ask for the answer to a previously-answered question (e.g., "What was your first pet's name?") or selection of true semi-public information about the authorized user from among decoys (e.g., "At which of the following addresses did you reside in 2005: 1234 MAIN ST, 1414 MOCKINGBIRD LN, 99 W. ROUTE 66"). If the user passes the extra authentication (540), access is granted (550); if the user fails the authentication (560), access is denied (570) and the account may be locked pending further investigation (580).

Figure 6:
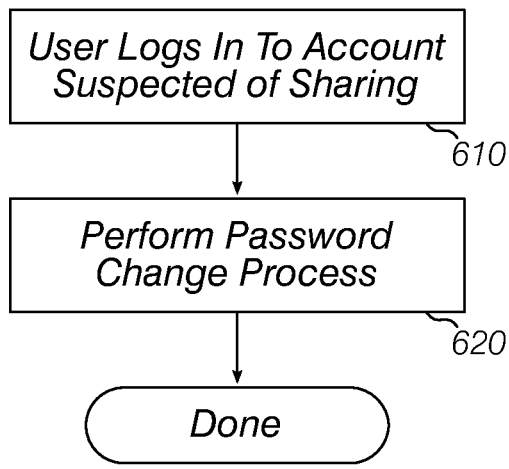
FIG. 6 shows how the "Password Change" remediation operation may proceed.

FIG. 6 shows a more aggressive remediation strategy. When a user logs into an account suspected of unauthorized sharing (610), the system initiates a password-change process (620), requiring the user to choose a new password. This is modestly inconvenient for an authorized user, but may be quite effective if the system enforces a rule that the new password must be different from previously-used passwords. An unauthorized user may be reluctant to change the password of an account that—it may be presumed—he knows he should not be accessing, and in any case, all unauthorized sharing of the account will be thwarted until the new password is given to users who should not have it. (In addition, the repeated dissemination of passwords can help establish willfulness, which may be important in a legal action to establish a breach of contract or license.)

Figure 7:
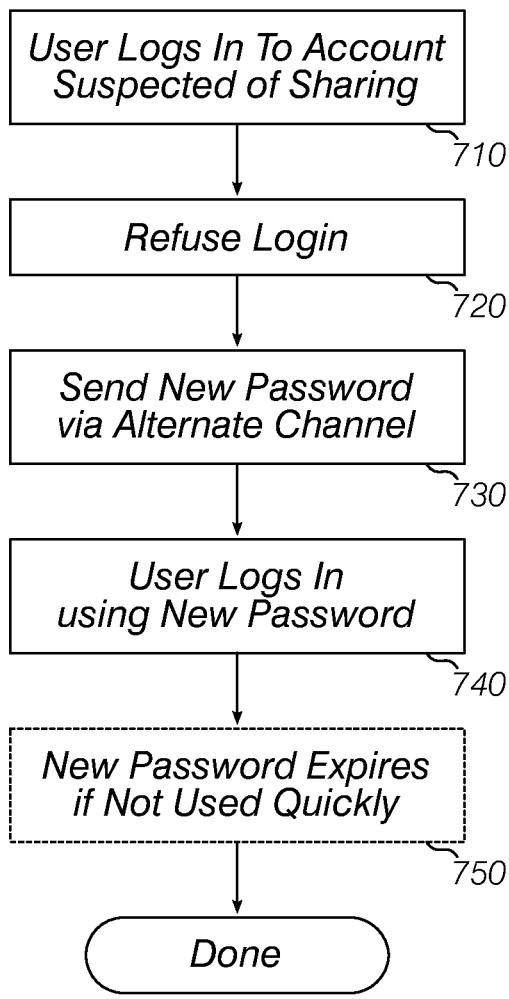
FIG. 7 outlines an "Issue New Password" operation.

FIG. 7 outlines an even-more aggressive strategy. Here, when the user logs in (710), the login is refused (720) and a new password is provided to the user via an alternate channel (730). For example, the password could be emailed to the authorized user or sent to a telephone via Small Message Service ("SMS") message or automated voice technology. The authorized user can use the new password to log in (740). This approach is slightly more inconvenient for an authorized user (including one who is not engaging in unauthorized account sharing) but it is more difficult for an unauthorized user to obtain the new password, unless he has access to the authorized user's email or phone. As further deterrent to unauthorized sharing, the system can set a short expiration time on the new password, so that if it is not used quickly, it will become invalid (750) and all access to the account will be disabled until the authorized user comes to terms with the service provider.

Often, an effective sharing remediation method will inconvenience a legitimate or authorized user less than an unauthorized user. For example, an email or phone message to the authorized user is more likely to reach that user than an unauthorized user. In fact, the legitimate user may be unaware of the misuse of his account, and may only learn of it when he receives a message that his password has been changed.

If other attempts to stop unauthorized access to an online resource fail, the system may automatically disable all access to the account in question until the reason for the frequent detection of suspicious sharing-like activity can be investigated and corrected.

The Analysis Server (FIG. 1, 160) may also notify the operators of the Web Server 130, or other personnel, of the sharing detection and remediation attempts, so that they may take additional manual steps as appropriate to prevent sharing.

In some embodiments of the invention, the sequence or levels of remediation steps taken may vary based on a customer classification, such as the size of the customer, its sales per year, or other factors.

In more general terms, embodiments of the invention add a number of nuances to a service provider's possible responses to unauthorized sharing or similar license term violations. In a black-and-white world, a provider might only choose to tolerate all sharing, or to cut off access on suspicion of sharing. The first option impacts revenue directly, and the section option risks antagonizing users who are not, in fact, violating their license terms.

Embodiments of the invention can make unauthorized sharing slightly—or significantly—more cumbersome for the cheating user. If a user is required to change his password upon login, then previously-shared passwords may be invalidated and the unauthorized users will be thwarted unless the new password is distributed again. (Furthermore, the repeated distribution in violation of license terms can help establish willfulness if the violation ultimately enters litigation.)

If a new password or confirmation code is sent to a particular cell phone or pager device, then only the person who has the device can log in. (In addition, if someone has stolen the authorized user's password, this embodiment can bring the theft to the authorized user's attention, so that he can change his other passwords as appropriate.) This approach offers some of the benefits of a dedicated one-time-password device without the cost and infrastructure requirements.

An embodiment of the invention may be a machine-readable medium having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In some embodiments, the instructions for a programmable processor may be treated as data and used to modulate a carrier signal, which can subsequently be sent to a remote receiver, where the signal is demodulated to recover the instructions, and the instructions are executed to implement the methods of an embodiment at the remote receiver. In the vernacular, such modulation and transmission are known as "serving" the instructions, while receiving and demodulating are often called "downloading." In other words, one embodiment "serves" (i.e., encodes and sends) the instructions of an embodiment to a client, often over a distributed data network like the Internet. The instructions thus transmitted can be saved on a hard disk or other data storage device at the receiver to create another embodiment of the invention, meeting the description of a machine-readable medium storing data and instructions to perform some of the operations discussed above. Compiling (if necessary) and executing such an embodiment at the receiver may result in the receiver performing operations according to a third embodiment.

In the preceding description, numerous details were set forth. It will be apparent, however, to one skilled in the art, that the present invention may be practiced without some of these specific details. In some instances, well-known structures and devices are shown in block diagram form, rather than in detail, in order to avoid obscuring the present invention.

Some portions of the detailed descriptions may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, including without limitation any type of disk including floppy disks, optical disks, compact disc read-only memory ("CD-ROM"), and magnetic-optical disks, read-only memories (ROMs), random access memories (RAMs), erasable, programmable read-only memories ("EPROMs"), electrically-erasable read-only memories ("EEPROMs"), magnetic or optical cards, or any type of media suitable for storing computer instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will be recited in the claims below. In addition, the present invention is not described with reference to any particular programming language. It will be appreciated that a variety of programming languages may be used to implement the teachings of the invention as described herein.

The applications of the present invention have been described largely by reference to specific examples and in terms of particular allocations of functionality to certain hardware and/or software components. However, those of skill in the art will recognize that unauthorized account sharing can also be reduced by software and hardware that distribute the functions of embodiments of this invention differently than herein described. Such variations and implementations are understood to be captured according to the following claims.

We claim:

1. A method comprising:
processing an authentication request in connection with an account for access to an online resource;
determining, by a processor, whether the account is suspected of unauthorized sharing between a legitimate user and at least one non-legitimate user;
when the account is not suspected of unauthorized sharing, granting access to the online resource; and
when the account is suspected of unauthorized sharing, automatically selecting a sharing remediation technique from a plurality of sharing remediation techniques; and
applying the sharing remediation technique, wherein the automatically selecting operation comprises:
determining whether the suspicion of unauthorized sharing is an initial suspicion of unauthorized sharing or a recurring suspicion of unauthorized sharing; and
when the suspicion of unauthorized sharing is an initial suspicion of unauthorized sharing, selecting a mild sharing remediation technique; and
when the suspicion of unauthorized sharing is a recurring suspicion of unauthorized sharing, selecting a severe sharing remediation technique.

2. The method of claim 1 wherein a suspicion of unauthorized sharing occurring more than a configurable period of time after a prior suspicion of unauthorized sharing is an initial suspicion of unauthorized sharing.

3. The method of claim 1 wherein the plurality of sharing remediation techniques comprises:
displaying an anti-sharing message.

4. The method of claim 3 wherein displaying the anti-sharing message is displaying the anti-sharing message with a first post-authentication page.

5. The method of claim 3 wherein displaying the anti-sharing message is displaying the anti-sharing message in an interstitial page before a first post-authentication page.

6. The method of claim 3 wherein displaying the anti-sharing message is displaying the anti-sharing message in a pop-up dialog window.

7. The method of claim 1 wherein the plurality of sharing remediation techniques comprises:
sending an anti-sharing message via an alternate communication channel.

8. The method of claim 7 wherein the alternate communication channel is an electronic-mail message.

9. The method of claim 7 wherein the alternate communication channel is a Small Message Service ("SMS") text message.

10. The method of claim 1 wherein the plurality of sharing remediation techniques comprises:
performing a supplemental authentication operation before granting access to the account.

11. The method of claim 10 wherein the supplemental authentication operation is one of:
obtaining an answer to a previously-answered question of personal knowledge; or
requiring selection of a true semi-public information item from among a plurality of decoy information items; or
performing a keystroke-dynamics typing test.

12. The method of claim 1 wherein the plurality of sharing remediation techniques comprises:
forcing a password change for the account.

13. The method of claim 1 wherein the plurality of sharing remediation techniques comprises:
transmitting a new password for the account to an authorized user of the account via an alternate communication channel.

14. The method of claim 13 wherein transmitting the new password for the account comprises:
sending an electronic mail message; or
sending a Small Message Service ("SMS") text message; or
sending an automatic voice message to a telephone associated with the authorized user.

15. The method of claim 1 wherein the plurality of sharing remediation techniques comprises:
scheduling a workflow item to cause a human contact on a party responsible for the account that is suspected of unauthorized sharing.

16. The method of claim 1 wherein the plurality of sharing remediation techniques comprises:
restricting access to the account that is suspected of unauthorized sharing.

17. The method of claim 1 wherein the plurality of sharing remediation techniques comprises:
alerting an operator of the online resource about the authentication request.

* * * * *